3,480,042
O-RING SEAL SEATING ARRANGEMENT FOR ROTARY PLUG VALVE
Frank H. Mueller and William L. Hauffe, Decatur, and William A. Hood, Cerro Gordo, Ill., assignors to Mueller Co., Decatur, Ill., a corporation of Illinois
Filed Oct. 12, 1967, Ser. No. 674,863
Int. Cl. F16k 11/02, 5/04; F16j 15/40
U.S. Cl. 137—625.22                                        7 Claims

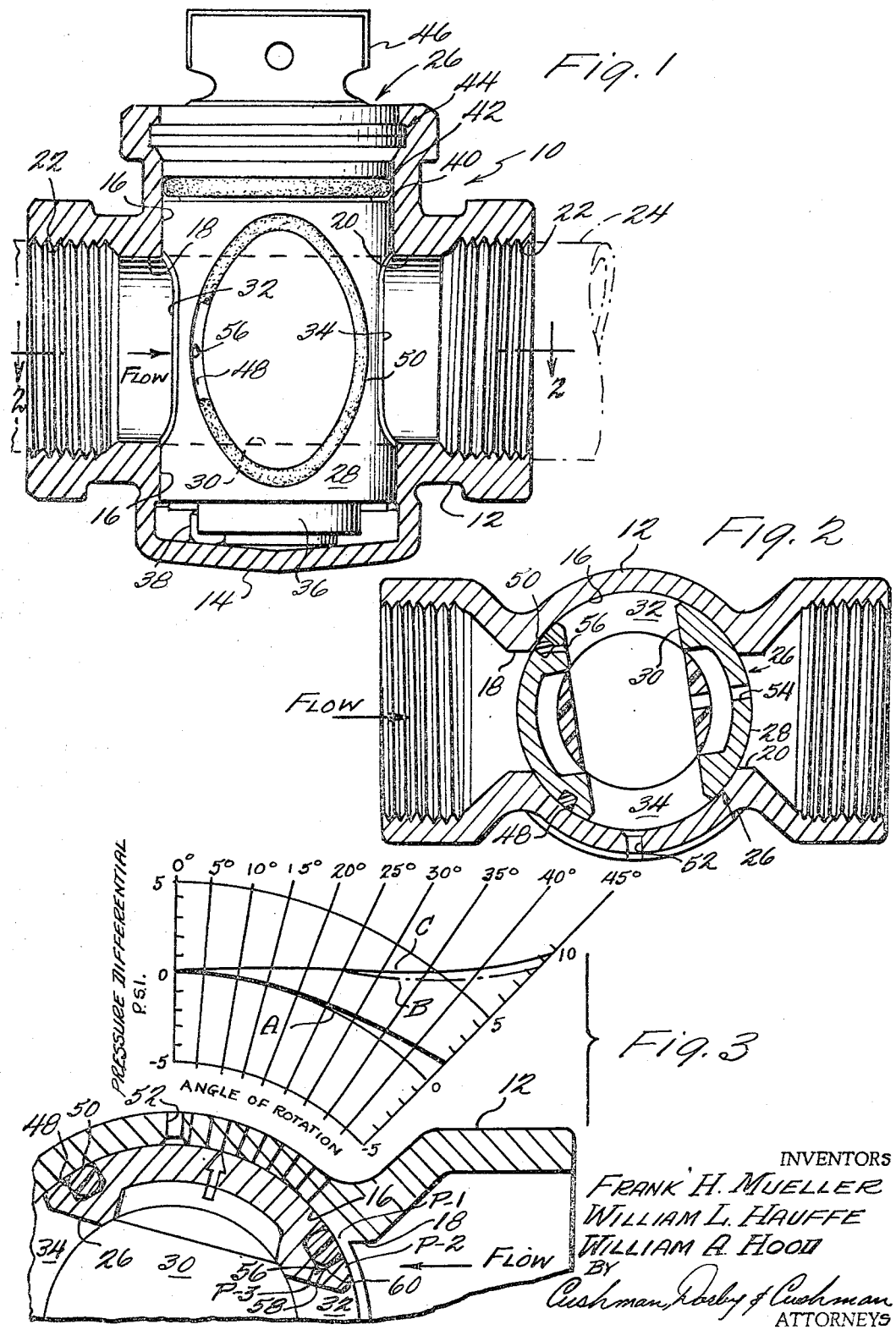

ABSTRACT OF THE DISCLOSURE

A rotary plug valve having a plug member rotatable in a housing member between an open position and a closed position, the plug member carrying an O-ring seal in a groove provided in its surface, the O-ring seal being adapted to encircle the inlet port of the housing member when the plug member is in the closed position, the plug member further being provided with means for relieving the pressure beneath the O-ring seal and creating a differential pressure across the O-ring seal to cause the same to be drawn into the groove on the plug as the plug member approaches the full open position.

---

The present invention relates to improvements in rotary plug valves and, more particularly, to an improvement in seating arrangement of O-ring seals or the like on the plug member of a rotary plug valve.

The present invention relates to a rotary plug valve of the type shown and described in the copending application of Frank H. Mueller and William L. Hauffe, serially numbered 449,498, filed Apr. 20, 1965, and now United States Patent No. 3,349,799, issued Oct. 31, 1967. While the improvement to rotary plug valves is disclosed and described herein with respect to a "closed bottom" plug valve, it will be realized by those skilled in the art that the present invention may be utilized in any type of plug valve wherein it is desired to carry the O-ring on the plug member for sealing around the inlet port of the valve housing when the valve is in the closed position.

An important object of the present invention is to provide an improved seating arrangement for O-ring seals in a plug valve, the seating arrangement providing for the relieving of pressure beneath the O-ring seal and/or the drawing of the O-ring seal into its seat so that the O-ring is not clipped as the valve is being opened and approaches the full open position.

Ancillary to the immediately preceding object it is a further object of the present invention to provide a means for relieving the pressure beneath an O-ring seal in a groove on the plug member of a rotary plug valve, the means not interfering with the seating surfaces on the groove for the O-ring.

Another object of the present invention is to provide a means for relieving pressure behind or beneath an O-ring seal in a rotary plug valve to prevent the seal from being pushed out of its groove upon the opening of the valve, the means utilizing the flow of fluid through the passage of the plug member to create a venturi effect for reducing pressure behind the O-ring seal.

In the prior art, means have been provided for venting a groove carrying an O-ring seal but such means were utilized to retain the O-ring seal upon initial opening of the valve as the attempts were to overcome the jet effect created as the valve opens. These prior art arrangements were related to O-ring seals provided on the plug member for sealing around the outlet port of the valve housing member, it being felt that no means need be provided on valve arrangements where the O-ring seals around the inlet port as the direct pressure on the O-ring would function to retain the O-ring seal in its groove. However, it has been found that when a rotary plug valve having an O-ring seal in the plug member for sealing around the inlet opening approaches its full open position, the static pressure on that portion of the O-ring seal in the fluid stream builds up on and seeps beneath the O-ring seal to cause the same to unseat from its groove and thus be clipped by the wall of the housing member upon full opening of the valve. The present invention utilizes the flow of fluid through the flow passage in the plug member to create a venturi effect, this being accomplished by providing a hole in the plug member opening to the flow passage and also opening to the groove at a point beneath the O-ring in an area where it does not affect the normal seating surface of the groove for the O-ring seal.

The above and other objects and advantages of the present invention will become more apparent from the following specification, claims and accompanying drawings in which:

FIGURE 1 is a vertical sectional view of a rotary plug valve incorporating the present invention, the plug member being shown in elevation but the O-ring seal being broken away to illustrate the hole;

FIGURE 2 is a sectional view taken substantially on the line 2—2 of FIGURE 1, but illustrating the plug member just as the same approaches full closing, and FIGURE 3 is a diagrammatic fragmentary view similar to FIGURE 2 but illustrating graphically the differential pressures involved in the opening of the valve, especially in the area where the valve approaches full open position.

Referring now to the drawings wherein like character or reference numerals represents like or similar parts and in particular to FIGURES 1 and 2, there is shown a rotary plug valve 10 having a housing member 12 with an integral closed bottom 14. The housing member 12 is provided with a cylindrical shaped valve seat 16 of uniform diameter having diametrically opposed inlet and outlet ports 18 and 20 respectively. The inlet and outlet ports 18 and 20 are preferably interiorly threaded at their outer ends as indicated at 22 for connecting the valve 10 in a fluid line 24 (shown in phantom lines), the fluid line being a water line or the like to a dwelling.

Rotatably mounted in the valve seat 16 is a valve key or valve plug member generally designated at 26, the plug member having an exterior cylindrical surface 28 of uniform, slightly smaller, diameter than that of the valve seat 16 and coextensive therewith.

The plug member 26, which may be constructed in the manner disclosed in the aforementioned copending application Ser. No. 449,498, is provided with a flow passage 30 therethrough having opposed inlet and outlet port openings 32 and 34 respectively. The plug member 26 is provided at its lower end with an arcuate check lug 36 which cooperates with an arcuate flange 38 on the closed bottom 14 of the housing member to provide a means for limiting the rotation of the plug member 26 in the order of 90° whereby the plug member can rotate between a first position where the valve is open and the flow passage 30 of the plug member is in alignment with the inlet and outlet ports 18 and 20 respectively of the housing member 12 and a second position where the valve is closed and the flow passage in the plug member is out of registration with the inlet and outlet ports of the housing member. Details of the means for restricting rotation are fully disclosed in the aforementioned application Ser. No. 449,498 and, therefore, need not be repeated further herein.

The upper portion of the plug member 26 is provided with a circumferential groove 40 of uniform depth on its cylindrical surface. The groove 40 is arranged to receive an O-ring seal 42 which cooperates with the valve seat 16 to prevent fluid such as water leaking outwardly between the valve seat and the plug member when the plug member is in the open position.

Positioned above the O-ring 42 and groove 40 is a retainer ring and thrust washer assembly generally indicated at 44 for retaining the plug member 26 axially within the housing member 12. The retainer ring and thrust washer arrangement 44 may be of the type disclosed in the copending application of Lawrence F. Luckenbill, serially numbered 464,636, filed June 17, 1965, and now United States Patent No. 3,350,057, issued Oct. 31, 1967. The plug member 26 is provided at its upper end with a reduced portion extending outwardly of the housing member 12 and terminating in a flattened noncircular head 46, the head being capable of receiving a wrench for operation of the valve.

An endless groove 48 of uniform depth and substantially rectangular in cross-section is provided on the exterior of the surface 28 of the plug member 26 intermediate the port openings 32 and 34, the groove being arranged on the side of the plug which will face the inlet port of the housing member when the plug is in the closed position. An O-ring seal 50 is disposed within the groove 48 for sealing engagement with the opposed surface of the valve seat 16 of housing member 12. As clearly shown in FIGURE 2 when valve 10 is in the closed position, the O-ring seal 50 will encircle the inlet port 18 and when the valve 10 is in the open position, the O-ring seal 50 encircles a drain port 52 provided in the housing member 12. Plug member 26 is provided with a drain port 54 which communicates with the interior flow passage 30 and thus when the plug member is in closed position, the drain port 54 provides communication between the outlet port 20 and the interior of the flow pasage 30 while the drain port 52 provides communication between the flow passage 30 and the exterior of the housing member 12.

Referring now specifically to FIGURE 3, it will be noted that the plug member 26 is provided with a passage hole 56 opening to the flow passage 30 in the plug at 58 and to the groove 48 at one corner thereof as indicated at 60. The passage hole 56 functions to relieve pressure back of the O-ring seal 50 as the plug is moved toward the full open position. With the fluid flowing through the valve 10 in the direction of the arrow in FIGURE 3, it will be noted that a static pressure is built up at the point P–1 as the plug is moved toward the full open position. With the static pressure P–1 building up, there is a tendency for some of the fluid to seep down the walls of the groove 48 and underneath the O-ring seal 50 tending to force the portion of the O-ring seal exposed to the inlet port outwardly and as the plug member 26 is moved toward the full open position, the O-ring will have a tendency to scrape or clip against the wall of the valve seat 16, thus, destroying its efficiency. By providing the passage hole 56 in the plug member 26 as described, the pressure is relieved behind the O-ring seal 50 and there is a tendency for the O-ring seal to be drawn tightly in the groove 48 as the pressure at P–3 is less than the static presure at P–1. This is caused by a venturi effect in the flow passage of the flow of fluid past the opening 58. The pressure P–2 either equals the pressure at P–1 or is slightly less than the pressure at P–1 as this pressure becomes a dynamic flowing pressure due to the fluid turning away and flowing through the flow passage 30.

The graph shown immediately above the diagrammatic figure of the valve in FIGURE 3 illustrates the differential pressures incolved in the opening of the valve. The first curve represented by the letter A discloses the differential pressure of P–1 minus P–2. It will be noted that as the plug member 26 is rotated toward zero degree angle of rotation, which is the full open position, the differential is substantially zero between these two pressures. However, two other curves are represented, namely, the curves B and C which represent respectively the pressure differential of P–2 minus P–3 and P–1 minus P–3. P–3 is always less than either P–2 or P–1 and further the greatest differential is encountered between the static pressure buildup at P–1 and the pressure at P–3 which is very low because of the venturi effect of the hole opening to the flow passage 30 where there is relatively high flow of fluid. Since P–3 is less than P–1, any pressure which may have seeped behind the O-ring seal 50 is drawn out or relieved through the passage hole 56. Additionally, because the pressure in the passage hole 56 is less than the static pressure to which the O-ring seal is subjected, there is a tendency for the O-ring to be drawn tightly into the groove as it approaches the point where it will leave the port opening 18 and contact the wall of the valve seat 16. By having the passage hole 56 opening to the corner of the generally rectangularly shaped groove 48, the portions of the groove which are normally contacted by the O-ring are not affected and thus there is no damage to the O-ring in the area of the opening 60 of the hole 56 to the groove.

The graph shown in FIGURE 3 is based on a test of a two inch diameter valve having water flow through the same at 52.3 gallons per minute at a pressure of 50 p.s.i.

The valve structure and specifically the O-ring seat arrangement described and illustrated in the drawings fully and effectively accomplishes the objects and advantages of the invention. It will be realized that the foregoing specific embodiments have been shown and described only for the purpose of illustrating the principles of the invention.

Therefore, the terminology used in this application is for the purpose of description and not limitation, the spirit and scope of the invention being defined in the claims.

What is claimed is:

1. A rotary plug valve comprising: a housing member having a valve seat provided with an inlet port and a diametrically opposed outlet port; a plug member rotatable in said valve seat and having a flow passage therethrough with port openings at each end thereof; means to limit rotation of said plug member between two positions, a first position where said valve is open and said flow passage is in registration with said inlet and outlet ports and a second position where said valve is closed and said flow passage is out of registration with said inlet and outlet ports; sealing means carried by said plug member and arranged to seal around said inlet port of said housing member when said plug member is in said second position, said sealing means including an endless groove on the surface of said plug member between the port openings of the same and a resilient sealing ring carried in said groove; and means in said plug member providing communication between said groove and said flow passage and defining an area of low pressure for relieving pressure beneath said sealing ring when said plug member approaches said first full open position whereby a differential pressure is created across said sealing ring to cause the same to be drawn tightly into said endless groove.

2. A rotary plug valve as claimed in claim 1 in which said last-mentioned means includes a passage hole in said plug member having one end opening to said groove beneath said sealing ring and at its other end opening to the flow passage through said plug member at a point adjacent the port opening of said plug member which cooperates with the inlet port of said housing member.

3. A rotary plug valve as claimed in claim 2 in which said sealing ring is an O-ring and in which said groove has a generally rectangular cross-section and said hole opens to the bottom chamfered corner of said groove.

4. A rotary plug valve as claimed in claim 3 in which said plug member has a drain passage therein communicating with the flow passage therein intermediate the port openings on the side of the plug member opposite the side having the sealing means thereon, said housing member having a drain port therein extending from the exterior thereof to said valve seat, said drain port in said housing member being aligned with the flow passage in said plug member when the plug member is moved to said second position and said drain passage in said plug member being aligned with the outlet port of said plug member when said plug member is in said second position.

5. A rotary plug valve comprising: a housing member having a valve seat therein provided with an inlet port and a dimetrically opposed outlet port; a plug member rotatable in said valve seat and having a flow passage therethrough with port openings at each end thereof; means to limit rotation of said plug member between two positions, a first position where said valve is open and said flow passage is in registration with said inlet and outlet ports and a second position where said valve is closed and said flow pasage is out of registration with said inlet and outlet ports; said plug member having an endless groove on the surface thereof between the port openings of the same and a resilient O-ring seal carried in said groove, said groove and O-ring seal being arranged to encircle and seal around said inlet port of said housing member when said plug member is in said second position and at least a portion of said O-ring seal being subjected to a static pressure upon approach of said plug member to said first full open position; and a passage hole through said plug member having one end opening to said groove beneath the portion of said sealing ring subjected to static pressure and its other end opening to the flow passage through said plug member at a point where a venturi effect is created thereacross by flow through the flow passage to thereby provide a reduced pressure in said hole for relieving any pressure beneath the O-ring and causing a differential pressure across said O-ring to tightly draw said O-ring into said groove.

6. A rotary plug valve as claimed in claim 5 wherein the opening of said hole to the flow passage in said plug member is at a point adjacent the port opening of said plug member which cooperates with the inlet port of said housing member.

7. A rotary plug valve as claimed in claim 6 in which said groove in said plug member is generally rectangular in cross-section and in which the opening of said hole to said groove is at a bottom chamfered corner of said groove.

References Cited
UNITED STATES PATENTS

| | | | |
|---|---|---|---|
| 2,604,293 | 7/1952 | Phillips | 251—175 |
| 2,713,989 | 7/1955 | Bryant | 251—324 |
| 2,911,187 | 11/1959 | Owsley | 251—316 |
| 3,077,902 | 2/1963 | Vickery | 251—317 XR |
| 3,155,368 | 11/1964 | Shafer | 251—315 XR |

FOREIGN PATENTS

| | | |
|---|---|---|
| 1,450,707 | 7/1966 | France. |
| 1,475,847 | 2/1967 | France. |
| 983,178 | 2/1965 | Great Britain. |

HENRY T. KLINKSIEK, Primary Examiner

U.S. Cl. X.R.

277—71